United States Patent
Larson et al.

(10) Patent No.: US 9,229,228 B2
(45) Date of Patent: Jan. 5, 2016

(54) CONFORMAL CAPABLE HEAD-UP DISPLAY

(71) Applicant: HONEYWELL INTERNATIONAL INC., Morristown, NJ (US)

(72) Inventors: Brent D. Larson, Phoenix, AZ (US); Kanghua Lu, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 83 days.

(21) Appl. No.: 14/102,950

(22) Filed: Dec. 11, 2013

(65) Prior Publication Data

US 2015/0160457 A1   Jun. 11, 2015

(51) Int. Cl.
G02B 27/14   (2006.01)
G02B 27/01   (2006.01)

(52) U.S. Cl.
CPC ...... *G02B 27/0101* (2013.01); *G02B 2027/011* (2013.01); *G02B 2027/014* (2013.01)

(58) Field of Classification Search
CPC ................ G02B 27/01; G02B 27/283; G02B 2027/0187
USPC ...................... 359/13, 14, 630–633
See application file for complete search history.

(56) References Cited

U.S. PATENT DOCUMENTS

| | | | |
|---|---|---|---|
| 4,723,160 A * | 2/1988 | Connelly ...................... | 348/115 |
| 5,552,935 A | 9/1996 | Knoll et al. | |
| 5,805,119 A * | 9/1998 | Erskine et al. .................... | 345/7 |
| 6,473,240 B1 * | 10/2002 | Dehmlow ...................... | 359/630 |
| 6,750,832 B1 | 6/2004 | Kleinschmidt | |
| 7,123,418 B2 | 10/2006 | Weber et al. | |
| 7,203,005 B2 | 4/2007 | Jiang et al. | |
| 8,422,112 B2 | 4/2013 | Li et al. | |
| 2002/0089756 A1 | 7/2002 | Aoki et al. | |
| 2009/0128901 A1 * | 5/2009 | Tilleman et al. .............. | 359/475 |
| 2010/0091027 A1 | 4/2010 | Oyama et al. | |
| 2012/0139817 A1 | 6/2012 | Freeman | |

FOREIGN PATENT DOCUMENTS

| | | |
|---|---|---|
| DE | 20304399 U1 | 6/2003 |
| DE | 102009054232 A1 | 5/2011 |
| EP | 0170523 A2 | 2/1986 |
| FR | 2860601 A1 | 4/2005 |
| WO | 03102666 A1 | 12/2003 |
| WO | 2006128862 A1 | 12/2006 |

OTHER PUBLICATIONS

EP Search Report for Application No. 14193519.7 dated Apr. 8, 2015.

* cited by examiner

*Primary Examiner* — Mahidere Sahle
(74) *Attorney, Agent, or Firm* — Ingrassia Fisher & Lorenz, P.C.

(57) ABSTRACT

A system and method of displaying a conformal-capable head-up display image is provided. A pre-distorted right-eye image and a pre-distorted left-eye image are separately generated and projected toward a windscreen. The pre-distorted right-eye image is reflected off of the windscreen to supply a reflected right eye image to a right eyebox, and the pre-distorted left-eye image is reflected off of the windscreen to supply a reflected left eye image to a left eyebox. The reflected right-eye image and the reflected left-eye image are each non-distorted images.

20 Claims, 6 Drawing Sheets

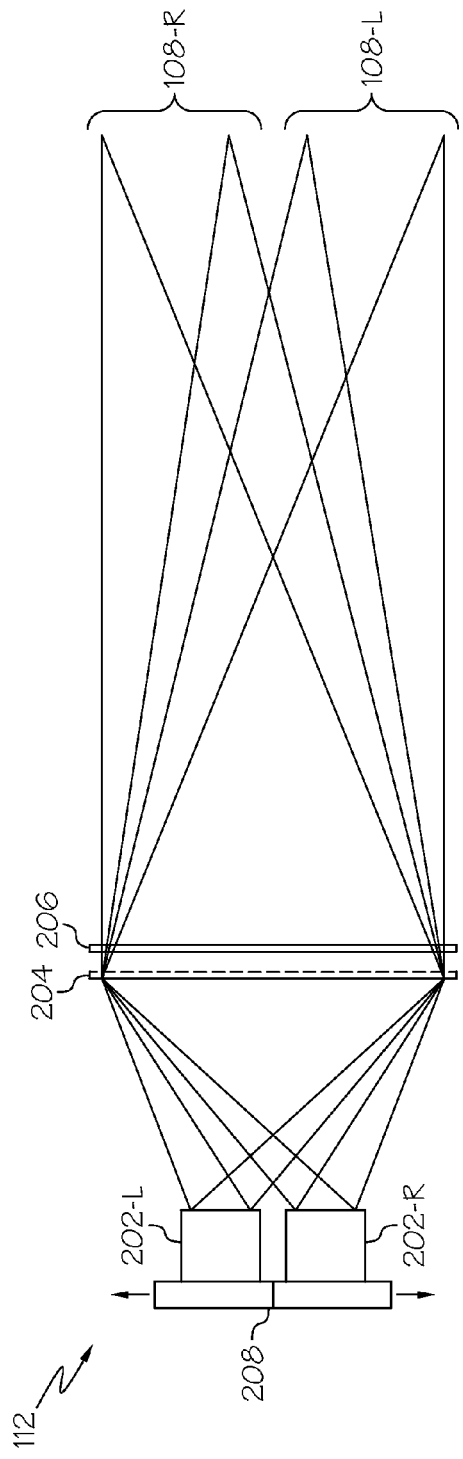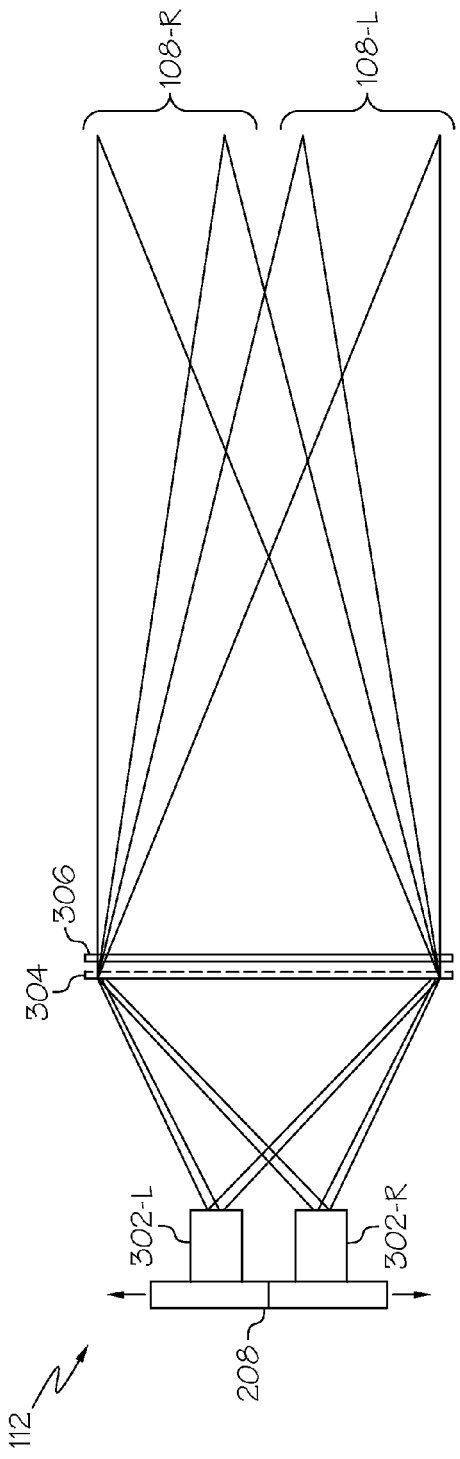

CONFORMAL CAPABLE HEAD-UP DISPLAY

TECHNICAL FIELD

The present invention generally relates to head-up displays (HUDs), and more particularly relates to a HUD that may use a vehicle windscreen as the combiner and is capable of conformal as well as non-conformal operation.

BACKGROUND

Head-up displays (HUDs) are becoming increasingly popular in the aerospace industry. Known HUDs typically include at least a projector, a combiner, and an image generator. The projector receives images supplied from the image generator, and the HUD will typically include an optical collimator, such as a convex lens or concave mirror, to produce an image that is perceived to be at infinity.

The combiner reflects the image projected by the projector in such a way as to see the field of view and the projected infinity image at the same time. The combiner is typically a very precisely designed and controlled optical element and may be flat or curved. Some combiners may also have special coatings that reflect certain wavelengths of light projected onto it from the projector while allowing all other wavelengths of light to pass through.

Traditional prior art HUDs typically rely on sophisticated optics to meet the performance requirements for avionic use. These performance requirements include precise angular control and uniformity over an exit pupil or head box that is large enough to encompass both eyes of a pilot or other user. As an example, the size, weight and cost of a bulky overhead unit (OHU) may be driven to a large extent by the required performance levels.

Hence, there is a need for a HUD that does not rely upon sophisticated optics to meet the performance requirements needed for use in avionics environments. The present invention addresses at least this need.

BRIEF SUMMARY

In one embodiment, a conformal-capable head-up display system includes a projector and a windscreen. The projector is configured to separately generate and project a pre-distorted right-eye image and a pre-distorted left-eye image. The windscreen is positioned to receive the pre-distorted right-eye image and the pre-distorted left-eye image. The windscreen reflects the pre-distorted right-eye image to supply a reflected right-eye image to a right eyebox and the pre-distorted left-eye image to supply a reflected left-eye image to a left eyebox. The reflected right-eye image and the reflected left-eye image are each non-distorted images.

In another embodiment, a method of displaying a conformal-capable head-up display image includes separately generating and projecting a pre-distorted right-eye image and a pre-distorted left-eye image toward a windscreen. The pre-distorted right-eye image is reflected off of the windscreen to supply a reflected right eye image to a right eyebox, and the pre-distorted left-eye image is reflected off of the windscreen to supply a reflected left eye image to a left eyebox. The reflected right-eye image and the reflected left-eye image are each non-distorted images.

In yet another embodiment, a conformal-capable head-up display system includes a windscreen and a projector. The windscreen has one or more optical characteristics and positioned to receive a pre-distorted right-eye image and a pre-distorted left-eye image. The windscreen is configured to reflect the pre-distorted right-eye image to supply a reflected right-eye image to a right eyebox, and to reflect the pre-distorted left-eye image to supply a reflected left-eye image to a left eyebox. The projector is configured to separately generate the pre-distorted right-eye image and the pre-distorted left-eye image based on the one or more optical characteristics of the windscreen. The projector is further configured project the pre-distorted right-eye image and the pre-distorted left-eye image toward the windscreen. The reflected right-eye image and the reflected left-eye image are each non-distorted images.

Furthermore, other desirable features and characteristics of the conformal-capable head-up display system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 2 and 3 depict functional block diagrams of two different example embodiments of a projector that may be used to implement the system of FIG. 1;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
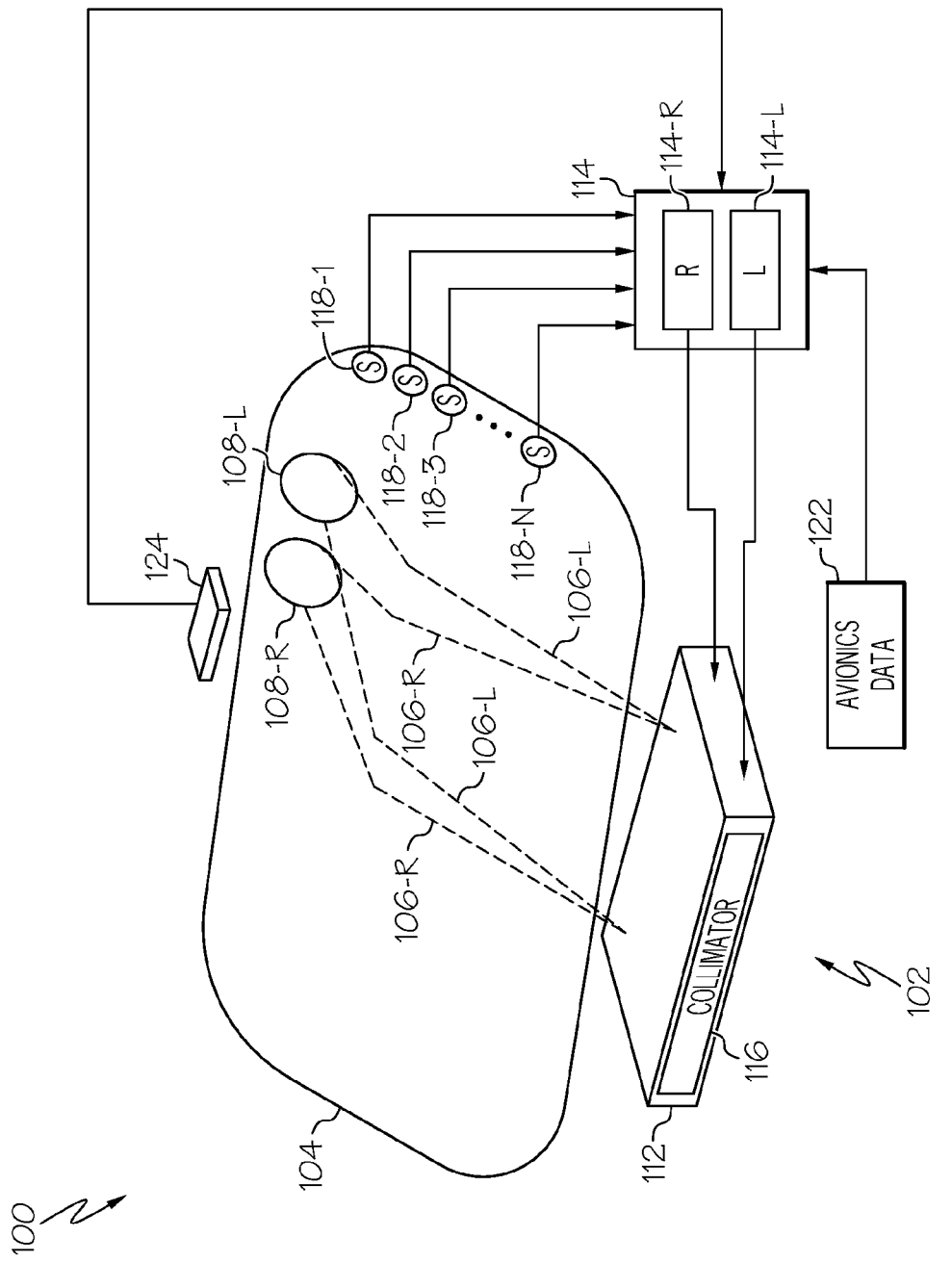
FIG. 1 depicts a functional block diagram of an embodiment of a conformal-capable head-up display system.

Referring to FIG. 1, a functional block diagram of one embodiment of a conformal-capable head-up display system 100 is depicted and includes a projector 102 and a windscreen 104. The projector 102 is configured to separately generate and project a right-eye image 106-R and a left-eye image 106-L. The windscreen 104 is positioned to receive the right-eye image 106-R and the left-eye image 106-L, and reflects the right-eye image 106-R to a right eyebox 108-R and the left-eye image 106-L to a left eyebox 108-L. Before proceeding further, it is noted that the term "eyebox" as used herein, is equivalent to the term "eye motion box." Moreover, in some embodiments, the eyeboxes 108 may take the form of the exit pupils of an optical system. The term "conformal-capable" as used herein indicates that the described embodiment(s) can be configured to display imagery which is substantially conformal to a forward scene observable through the windscreen or other image combiner element, although the system may also be used in non-conformal modes and applications as well as configurations with little or no see-through to an outside scene.

The projector 102 may be variously configured to implement its function, but in the depicted embodiment it includes a projection unit 112 and a pair of image generators 114—a right-eye image generator 114-R and a left-eye image generator 114-L. The projection unit 112 receives pre-distorted images that are separately generated by each of the image generators 114, and then projects the pre-distorted images the windscreen 104. It will be appreciated that the projection unit 112 may be variously implemented. Two exemplary implementations are depicted in FIGS. 2 and 3, and with reference thereto will now be briefly described. Before doing so, it is noted that the depicted examples are both unfolded, and do not include any folding by the windscreen 104 or any other folding or correcting optics, such as a collimator.

Referring first to the embodiment depicted in FIG. 2, this projection unit 112 includes a right illuminator 202-R, a left illuminator 202-L, a lens 204, and an active matrix liquid crystal display (AMLCD) 206. The AMLCD 206 is configured to operate in field sequential mode, and is coupled to alternately receive and display pre-distorted right-eye and left-eye images, respectively, that are generated by the image generators 114. The right-eye and left-eye illuminators 202-R, 202-L serve to backlight the AMLCD 206, and have their timing synchronized such that the right-eye illuminator 202-R illuminates the pre-distorted right-eye image, and the left-eye illuminator 202-L illuminates the pre-distorted left-eye image. It will be appreciated that the right and left illuminators 202-R, 202-L could be implemented as a single, relatively larger illuminator with an electronically modifiable light valve, such as an LCD, to define and appropriately synchronize the effective output apertures.

The lens 204, which may be a Fresnel lens or the like, is disposed between the right and left illuminators 202-R, 202-L and the AMLCD 206. The lens 204 is configured to re-image each of the right and left illuminators 202-R, 202-L to the corresponding right eyebox 108-R and left eyebox 108-L, respectively. In the example shown, the output of each illuminator is reimaged with magnification, though other configurations are certainly possible.

As FIG. 2 further depicts, the projection unit 112 additionally includes a motion mechanism 208. The depicted motion mechanism 208 is coupled to, and is configured to selectively move, the right and left illuminators 202-R, 202-L. In other embodiments, the motion mechanism 208 could instead be coupled to and configured to selectively move the lens 204. Although only one axis of motion is depicted, this should not be construed as limiting in any way, and other axes of translational or rotational motion may be implemented. The purpose for including the motion mechanism 208 will be described further below.

Referring now to FIG. 3, the second exemplary embodiment is shown. This embodiment includes right 302-R and left 302-L image projectors, which receive the corresponding pre-distorted right-eye and left-eye images, and a lens 304, such as a Fresnel lens. However, rather than the AMLCD 206, the depicted embodiment includes a high gain diffuser 306. The high gain diffuser 306 is configured in this embodiment to function as a rear projection screen upon which the projectors are focused. The gain profile of diffuser 306 is selected to spread the viewing angle and thereby expand the right and the left eyeboxes 108-R, 108-L, while preventing (or at least minimizing) crosstalk between the right and the left eyeboxes 108-R, 108-L. If desired, an asymmetric gain profile may be selected to spread enlarge the eyebox further in one direction, such as the vertical direction, than in the other. As with the embodiment of FIG. 2, motion mechanism 208 may also be optionally included to move either the projectors or the Fresnel lens.

Returning now to FIG. 1, the image generators 114 generate and individually correct the images associated with each eye of a viewer, such as a pilot. That is, the right-eye image generator 114-R generates pre-distorted images associated with the right eye of a viewer, and the left-eye image generator 114-L generates pre-distorted images associated with the left eye of a viewer. The image generators 114 individually pre-distort the generated images so that the perceived binocular image of each displayed feature is located, after reflection by the windscreen 104, at the desired target position for that feature. Preferably the desired target position has a binocular vergence corresponding to optical infinity or far distance. In some embodiments, however, the image generators 112 may be capable of moving the target position closer, adjusting the effective vergence distance for viewing the feature by appropriately shifting the display feature in either or both of the right-eye and left-eye images.

Figure 4:
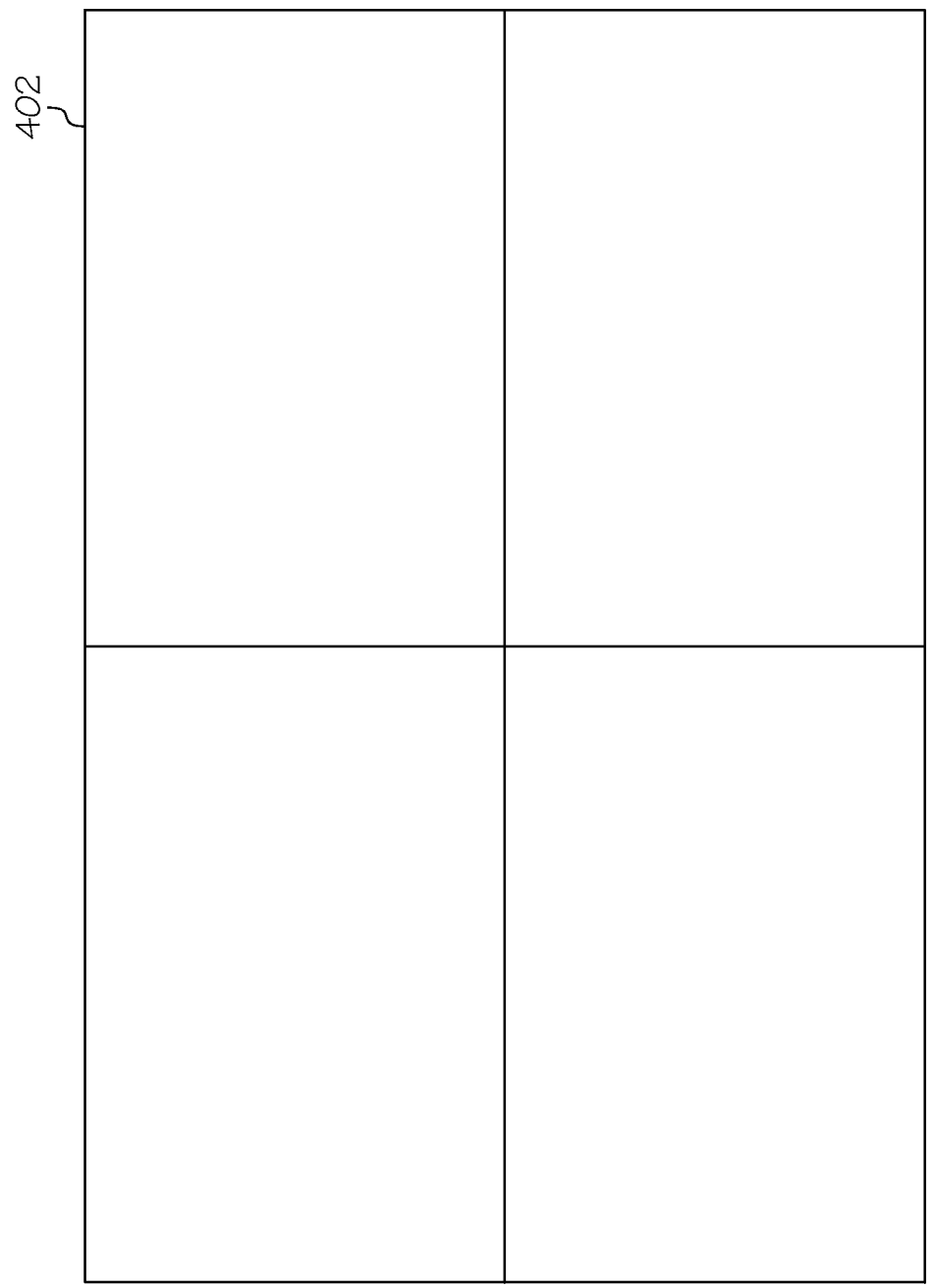
FIGS. 4 through 7 depict examples of undistorted, distorted and pre-distorted image views, where pre-distortion is used to compensate the otherwise distorted image views.

Before proceeding further, the reason for individually and separately pre-distorting the right eye and left eye images will now be described. To do so, reference should first be made to FIG. 4, which depicts a single rectilinear grid 402 having perpendicular row and column lines and square corners. In the following discussion, it is assumed that this single rectilinear grid 402 is the image being supplied from the image data source 114 and projected by the projection unit 112 toward the windscreen 104. It is additionally assumed that this image is not yet pre-distorted.

Figure 5:
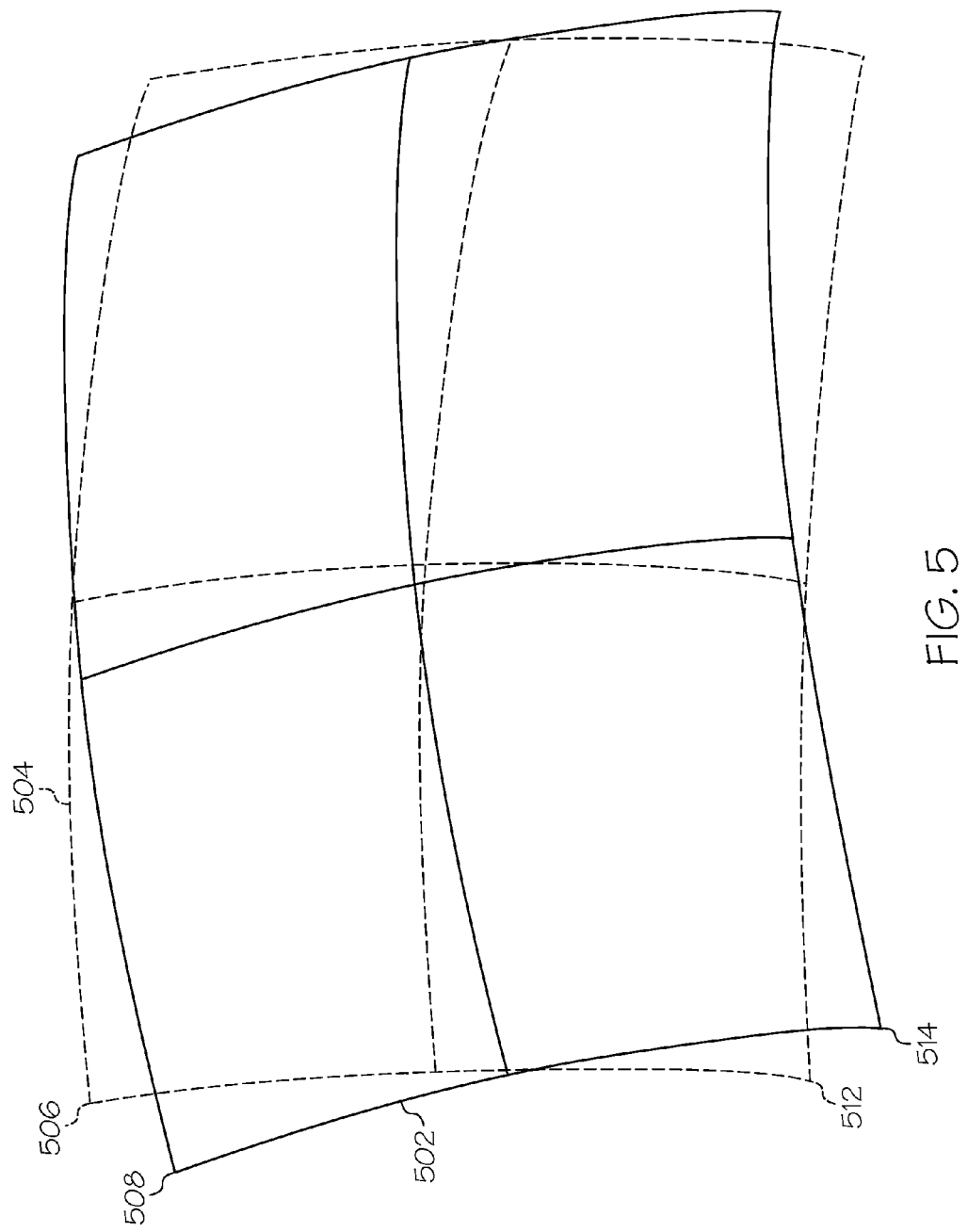

The corresponding exemplary images reflected by the windscreen 104 to the right and the left eyeboxes 108-R, 108-L are depicted in FIG. 5, and illustrate how the windscreen 104 may distort the reflected images. In particular, distorted image 502 depicts how the rectilinear grid 402 may appear at the right eyebox 108-R, and distorted image 504 depicts how the rectilinear grid 402 may appear at the left eyebox 108-L. In general, the two images 502, 504 will not coincide, and several misleading visual cues may result which are strongly dependent upon the particular windscreen shape and viewing configuration. The depicted system 100 is particularly directed at minimizing vergence cues that are misleading or even uncomfortable to view. Unlike some known display systems, such as stereoscopic displays, which are configured to specifically and deliberately modify the lateral separation of right and left images (the subset of vergence cues known as convergence and the related potential divergence) to portray depth, or apparent distance from the viewer, the depicted system 100 compensates that lateral separation in the presence of the image-distorting windscreen based on the specific viewing pupil locations to eliminate spurious and potentially dramatic apparent distance errors.

One particularly problematic visual anomaly with a non-symmetric windscreen reflectance profile, such as the example depicted in FIG. 5, is dipvergence, which is a vertical disparity between the views seen by the right and left eyes. Such vertical disparity is very uncomfortable to view, and is clearly present in the differentially distorted binocular views depicted in FIG. 5. The example depicted in FIG. 5 additionally illustrates how both the dipvergence and the convergence can vary dramatically across the effective field of view. In particular, it is seen that the apparent upper left corner 506 seen by the left eye is both above and to the right of the corresponding corner 508 as seen by the right eye, while the geometrical relationship is quite different for the apparent lower left corners 512, 514 and the other corners as well.

Figure 6:
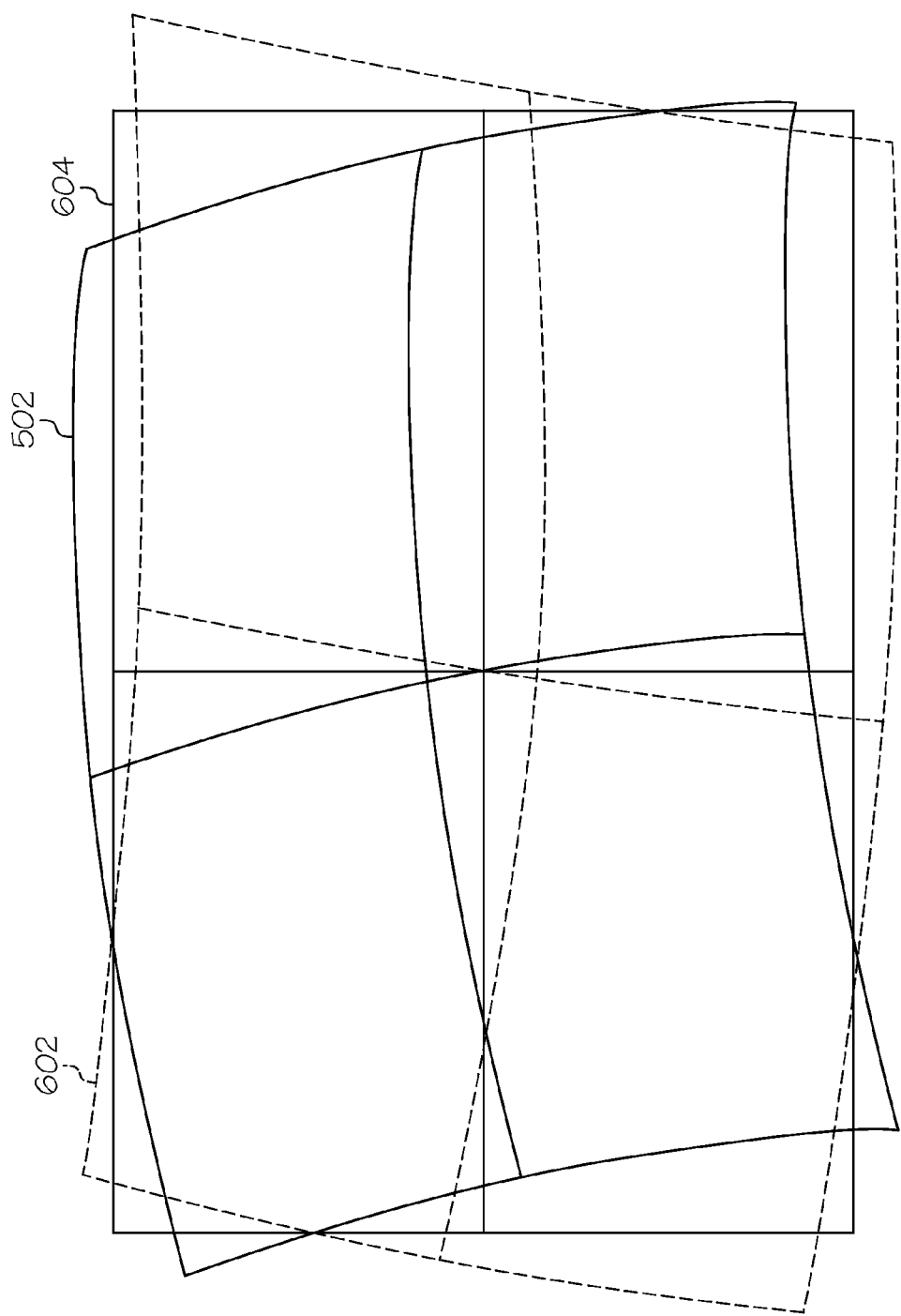
Figure 7:
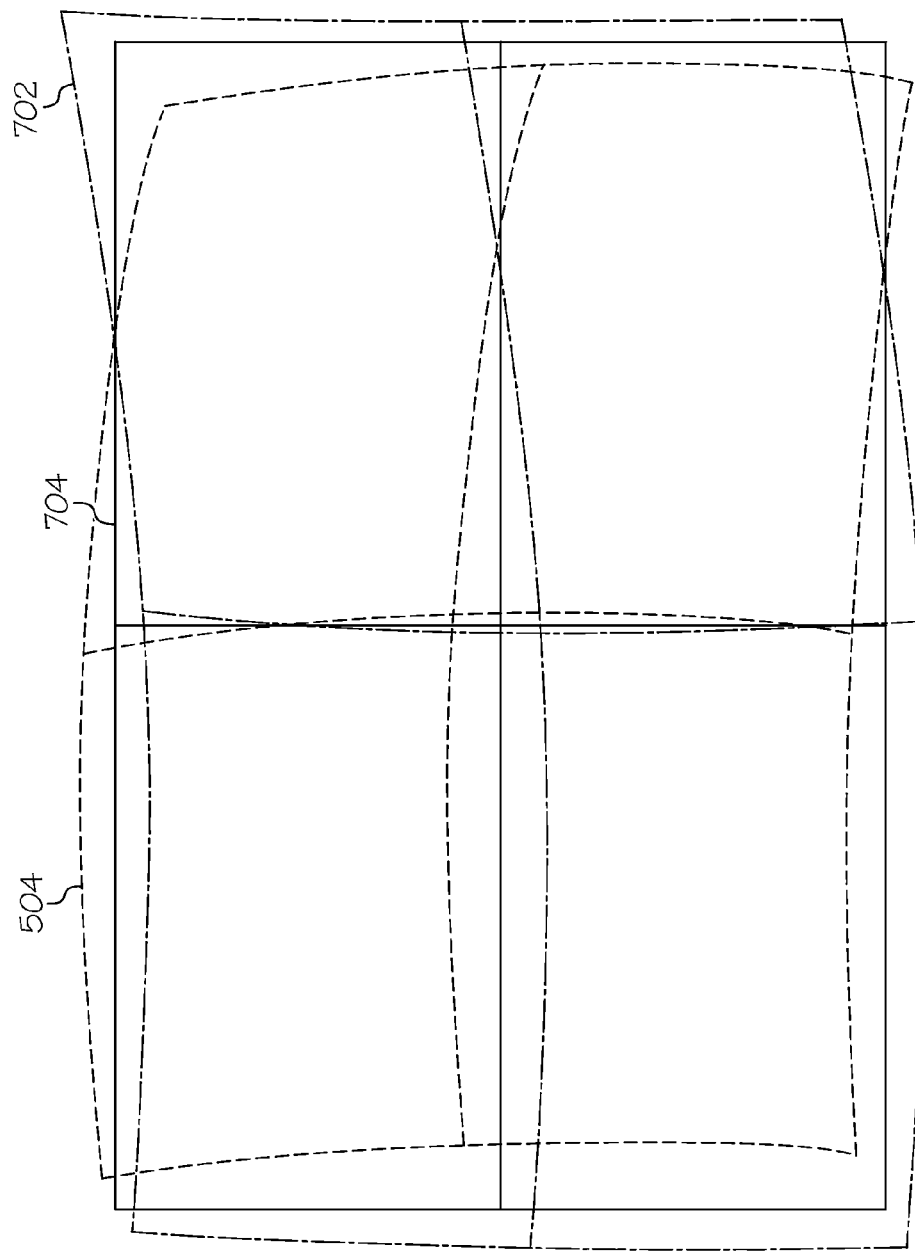

The system 100 described herein resolves these above-described disparities by separately applying appropriate but distinctly different geometric correction factors (e.g., pre-distortion) to the right and left image data such that both will overlay each other with preferably zero dipvergence and with the desired degree of convergence. This functionality is illustrated more clearly in FIGS. 6 and 7. In particular, FIG. 6 depicts the pre-distorted right-eye image 602, the distorted image 502, and the resulting nominal image 604 that would be seen from the right eyebox 108-R, and FIG. 7 depicts the pre-distorted left-eye image 702, the distorted image 504, and the resulting nominal image 704 that would be seen from the left eyebox 108-L. As FIGS. 6 and 7 clearly depict, the resulting nominal images 604, 704 are non-distorted and correspond to the rectilinear grid 402.

In the case of a feature which is desired to appear at a great distance away from a viewer (e.g., analogous to being fully collimated), the convergence is further adjusted to zero (e.g., parallel rays) by adjusting the effective lateral separation of the distortion-compensated nominal images 602 and 702 to preferably match the inter-pupillary distance (IPD) of the viewer. In this way, the perceived binocular location will be at a far distance. The location of a feature may also be adjusted to be conformal with a feature or object that is not part of the image being displayed but can be seen within the field of view, such as through the windscreen 104 or in front of the windscreen 104. This is accomplished by shifting the displayed feature and optionally adjusting the final convergence as seen by the viewer, but at the same time keeping dipvergence seen by the viewer to a minimum, preferably zero. In this manner, each eye will see the displayed feature as aligned with the corresponding non-image feature or object, and this conformality can be established whether the object is distant or near provided the appropriate degree of convergence is provided.

Returning once again to FIG. 1, the windscreen 104, which functions as a combiner, is preferably a conventional windscreen that is installed in a vehicle, such as various types of aircraft, various types of land craft (e.g., an automobile), or various types of watercraft. As such, the windscreen 104 has not been specifically designed with optimal optical characteristics, although such optimization is optional and can improve overall performance. However, the optical characteristics of the windscreen 104 have been measured, and these characteristics are preferably stored in each of the image generators 114. In this way, the right-eye image 106-R and the left-eye image 106-L are generated based not only on the image content, but on the optical characteristics of the windscreen 104 and any optional collimation or correction optics that may be present. Moreover, the windscreen 104 may not be symmetric, with respect to the locations of the eyeboxes 108, in the region receiving the right and left eye images 106-R, 106-L. Indeed, in some embodiments, the symmetry axis relating the right eyebox 106-R to the left eyebox 106-L does not match any symmetry axis of the windscreen (if such symmetry axis even exists). It will be appreciated that the disclosed system 100 and method could also be implemented with various other combiner elements (e.g., non-windscreen) in which such correction would simplify the optical requirements relative to a precision-designed optical system.

In some embodiments, the image generators 114 may be configured to actively compensate the images for slight deformations of the windscreen 104. For example, in one embodiment, the system 100 may additionally include one or more windscreen sensors 118 (e.g., 118-1, 118-2, 118-3 . . . 118-N). Each windscreen sensor 118 is configured to sense one or more parameters representative of the optical characteristics of the windscreen 104, and supply parameter signals representative thereof to the projector 102. It will be appreciated that the number of windscreen sensors 118 may vary. It will additionally be appreciated that each sensor may be variously configured and implemented to sense various parameters of the windscreen 104 that may impact its optical characteristics. For example, the windscreen sensors 118 may sense windscreen deformation, shifting, or temperature, just to name a few. It will be appreciated that the windscreen sensors 118 may be disposed in contact with, or remote from, the windscreen 104. As one example of the latter, a light source may be directed toward the windscreen 104, and the reflected light may be monitored by a sensor to detect deformation of the windscreen 104.

Regardless of the number and type of parameters that are sensed, the projector 102, and more specifically each image generator 114, is further configured, in response to the parameter signals, to determine the optical characteristics of the windscreen 104. The image generators 114, based on the determined optical characteristics, compensate the generated right-eye and left-eye images 106-R, 106-L for any variations in the optical characteristics of the windscreen 104.

In another embodiment, the system 100 may instead (or additionally) include an avionics data source 122. The avionics data source 122, which may be implemented using individual sensors, individual systems or subsystems, or as a single system, is configured to supply avionics data representative of one or more avionics parameters. The avionics parameters may vary, but are preferably parameters that may impact the optical characteristics of the windscreen 104. Some non-limiting examples of such avionics parameters include altitude, airspeed, and differential pressure, just to name a few.

Again, regardless of the number and type of avionics data that are supplied by the avionics data source, the projector 102, and more specifically each image generator 114, is further configured, in response to the avionics data, to determine the optical characteristics of the windscreen 104. The image generators 114, based on the determined optical characteristics, compensate the generated right-eye and left-eye images 106-R, 106-L for any variations in the optical characteristics of the windscreen 104.

The system 100 may be configured such that the eyeboxes 108 are stationary or dynamic. As may be appreciated, for the embodiments in which the eyeboxes 108 are not movable, the range of useful head motion from which the display could be seen is limited. In some of these embodiments, the eyeboxes 108 remain fixed in their locations, but the image content that is displayed is dynamically adjusted based on the location of each eye within the eyeboxes. In these embodiments, the location of each eye, and more specifically the location of the pupil of each eye, is determined, and image compensation, such as image warping or distortion correction (pre-distorting), is actively applied for each frame of each image 106-R, 106-L, based on the determined pupil location.

In other embodiments, the locations of the eyeboxes 108 themselves are dynamically repositioned to follow the locations of the respective eyes. Thus, both the image pre-distortion and the locations of the right eyebox 108-R and the left eyebox 108-L can vary with the locations of the right eye and left eye, respectively, of the viewer. In dynamic embodiments such as described here and in the previous paragraph, and as FIG. 1 further depicts, the system may preferably include a pupil location tracker 124. The pupil location tracker 124 is configured to sense the locations of the right eye and the left eye of a viewer, and to supply eye location signals representative of each eye location to the projector 102. It should be noted that the pupil location tracker 124 is not necessarily configured to sense and determine the direction in which the viewer may be looking. Rather, it is configured to sense the three-dimensional location of the right and left eyes of the viewer.

The pupil location tracker 124 may be implemented using any one of numerous known head and/or eye tracking schemes. In one embodiment, a dual camera system is used. In this exemplary system, each camera and associated image analysis algorithm detects the location of each eye pupil in the respective camera image. The true spatial position of each eye is then determined via triangulation or similar analysis of the image pair. It will additionally be appreciated that the means for dynamically repositioning the eyeboxes 108 may vary. For example, the system 100 may include the motion mechanism 208 depicted in FIGS. 2 and 3 and briefly described above to move, for example, the right and left illuminators 202-R, 202-L, or to move the lens 204. In other embodiments, the system 100 may instead include a scanning mirror system, or an electronically addressable illumination source or aperture within the projection unit 112 to vary eyebox positions, just to name a few. It should be noted that with each of these dynamic embodiments, the system 100 may also be configured to determine if one of the eyes of a viewer has moved beyond its respective eyebox range and into the opposite eyebox range. For example, if the right eye of the viewer moves into the left eyebox 108-L and the left eye of the view is outside of the left eyebox 108-L, the pupil location tracker 124 can provide the location of the viewer's right pupil to the image data source 114, so that the viewer's right eye can view the suitably corrected image for its particular location.

This system and method described herein is implemented using relatively simple HUD optics while actively maintaining minimal vergence errors, especially minimal dipvergence errors, as well as high conformality if desired. In particular, by implementing active compensation, the optical requirements for each projected eyebox are greatly simplified, which allows the use of compact and low cost optics. In particular, the required degree of image collimation by any optional additional optics may be significantly reduced or potentially eliminated.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A conformal-capable head-up display system, comprising:
    a projector configured to separately generate and project a pre-distorted right-eye image and a pre-distorted left-eye image; and
    a combiner positioned to receive the pre-distorted right-eye image and the pre-distorted left-eye image and to (i) reflect the pre-distorted right-eye image to supply a reflected right-eye image to a right eyebox and (ii) reflect the pre-distorted left-eye image to supply a reflected left-eye image to a left eyebox,
    wherein:
        the reflected right-eye image and the reflected left-eye image are each non-distorted images, and
        the reflected right-eye image and the reflected left-eye image present a binocular image having substantially zero dipvergence.

2. The system of claim 1, wherein:
    the combiner is a vehicle windscreen; and
    the projector is further configured to generate the pre-distorted right-eye image and pre-distorted the left-eye image based on one or more optical characteristics of the windscreen.

3. The system of claim 2, further comprises:
    one or more windscreen sensors, each windscreen sensor configured to sense one or more parameters representative of the optical characteristics of the windscreen and supply parameter signals representative thereof to the projector,
    wherein the projector is further configured, in response to the parameter signals, to determine the one or more optical characteristics of the windscreen.

4. The system of claim 2, further comprising:
    an avionics data source configured to supply avionics data representative of one or more avionics parameters to the projector,
    wherein the projector is further configured, in response to the avionics data, to determine the one or more optical characteristics of the windscreen.

5. The system of claim 1, further comprising:
    a pupil location tracker configured to sense locations of a right eye and a left eye of a viewer, the pupil tracker further configured to supply eye location signals representative of each eye location to the projector,
    wherein the projector is responsive to the location signals to selectively and individually compensate each frame of the right-eye image and the left-eye image to vary with the locations of the right eye and left eye, respectively, of the viewer.

6. The system of claim 5, wherein the projector is responsive to the location signals to selectively and individually compensate the locations of the right eyebox and the left eyebox to vary with the locations of the right eye and left eye, respectively, of the viewer.

7. The system of claim 1, wherein the combiner is asymmetric, with respect to locations of the right eyebox and the left eyebox, in a region receiving the right and left eye images.

8. The system of claim 7, wherein:
    a first symmetry axis relates the right eyebox 106-R to the left eyebox 106-L; and
    the first symmetry axis does not match any symmetry axis of the windscreen.

9. A method of displaying a conformal-capable head-up display image, comprising the steps of:
    separately generating and projecting a pre-distorted right-eye image and a pre-distorted left-eye image toward a windscreen;
    reflecting the pre-distorted right-eye image off of the windscreen to supply a reflected right eye image to a right eyebox; and
    reflecting the pre-distorted left-eye image off of the windscreen to supply a reflected left eye image to a left eyebox,
    wherein:
        the reflected right-eye image and the reflected left-eye image are each non-distorted images, and
        the reflected right-eye image and the reflected left-eye image present a binocular image having substantially zero dipvergence.

10. The method of claim 9, further comprising:
    generating the pre-distorted right-eye image and the pre-distorted left-eye image based on one or more optical characteristics of the windscreen.

11. The method of claim 10, further comprising:
    sensing one or more parameters representative of the optical characteristics of the windscreen; and
    determining the one or more optical characteristics of the windscreen from the one or more parameters.

12. The method of claim 10, further comprising:
    supplying avionics data representative of one or more avionics parameters; and
    determining the one or more optical characteristics of the windscreen from the avionics data.

13. The method of claim 9, further comprising:
    sensing locations of a right eye and a left eye of a viewer; and
    selectively and individually compensating the pre-distorted right-eye image and the pre-distorted left-eye image based on the sensed locations of the right eye and the left eye, respectively.

14. The method of claim 13, further comprising:
    selectively varying the locations of the right eyebox and left eyebox based on the locations of the right eye and left eye, respectively.

15. A conformal-capable head-up display system, comprising:
    a windscreen having one or more optical characteristics and positioned to receive a pre-distorted right-eye image and a pre-distorted left-eye image, the windscreen configured to (i) reflect the pre-distorted right-eye image to supply a reflected right-eye image to a right eyebox and (ii) reflect the pre-distorted left-eye image to supply a reflected left-eye image to a left eyebox; and
    a projector configured to separately generate the pre-distorted right-eye image and the pre-distorted left-eye image based on the one or more optical characteristics of the windscreen, the projector further configured project the pre-distorted right-eye image and the pre-distorted left-eye image toward the windscreen,
    wherein:
        the reflected right-eye image and the reflected left-eye image are each non-distorted images, and
        the reflected right-eye image and the reflected left-eye image present a binocular image having substantially zero dipvergence.

16. The system of claim 15, further comprising:
    one or more windscreen sensors, each windscreen sensor configured to sense one or more parameters representative of the optical characteristics of the windscreen and supply parameter signals representative thereof to the projector, wherein the projector is further configured, in response to the parameter signals, to determine the one or more optical characteristics of the windscreen.

17. The system of claim 15, further comprising:

an avionics data source configured to supply avionics data representative of one or more avionics parameters to the projector, wherein the projector is further configured, in response to the avionics data, to determine the one or more optical characteristics of the windscreen.

18. The system of claim 15, further comprising:

a pupil location tracker configured to sense locations of a right eye and a left eye of a viewer, the pupil tracker further configured to supply eye location signals representative of each eye location to the projector, wherein the projector is responsive to the location signals to selectively and individually compensate each frame of the pre-distorted right-eye image and the pre-distorted left-eye image based on the locations of the right eye and left eye, respectively, of the viewer.

19. The system of claim 18, wherein the locations of the right eyebox and the left eyebox vary with the locations of the right eye and left eye, respectively, of the viewer.

20. The system of claim 15, wherein the windscreen is asymmetric, with respect to locations of the right eyebox and the left eyebox, in a region receiving the right and left eye images.

* * * * *